United States Patent [19]

Feigel

[11] Patent Number: 5,839,717
[45] Date of Patent: Nov. 24, 1998

[54] VALVE WITH IMPROVED SHAFT RETAINER

[76] Inventor: Kurt R. Feigel, 1227 - 110A St., Edmonton, Alberta, Canada, T6J 6N6

[21] Appl. No.: 823,166

[22] Filed: Mar. 25, 1997

[51] Int. Cl.$^6$ ........................................................ F16K 1/22
[52] U.S. Cl. ............................................ 251/305; 251/306
[58] Field of Search ..................................... 251/305, 306

[56] References Cited

U.S. PATENT DOCUMENTS

| | | | |
|---|---|---|---|
| 2,883,149 | 4/1959 | Fiorentini | 251/306 |
| 3,612,483 | 10/1971 | Pool | 251/306 |
| 3,642,248 | 2/1972 | Benware | 251/172 |
| 3,997,142 | 12/1976 | Broadway | 251/307 |
| 4,395,017 | 7/1983 | Brautigan | 251/306 |
| 4,604,254 | 8/1986 | Yamamoto et al. | 264/254 |
| 4,653,724 | 3/1987 | Garrigues et al. | 251/306 |
| 4,826,133 | 5/1989 | Hiltebrand | 251/306 |
| 5,152,501 | 10/1992 | Raymond, Jr. | 251/305 |
| 5,222,382 | 6/1993 | De Vizzi | 70/212 |
| 5,299,597 | 4/1994 | Fort et al. | 137/385 |
| 5,598,724 | 2/1997 | Primeau | 70/177 |

FOREIGN PATENT DOCUMENTS

| | | |
|---|---|---|
| 1079251 | 6/1980 | Canada ..................................... 251/27 |
| 1098886 | 4/1981 | Canada ..................................... 251/27 |
| 2058427 | 12/1990 | Canada . |
| 2052915 | 6/1992 | Canada . |
| 2084381 | 6/1994 | Canada . |
| 2102717 | 8/1994 | Canada . |
| 2054610 | 5/1995 | Canada . |

OTHER PUBLICATIONS

Tricentric: High Performance Butterfly Valves, CS Valve Company Tricentric Division, Score Energy Products Inc., product brochure, 12 pages, undated, but precedes filing date of application.
Rotary Tight Shut–Off Valve Type MAK Series 316, Adams U.S.A., product brochure, 4 pages, undated, but precedes filing date of application.
The Universal Valve 30,000 Series, Vanessa Valve Corp., product brochure, 20 pages, undated, but precedes filing date of application.
MV Series, Butterfly Valves, Orton S.P.A., product brochure, 39 pages, undated, but precedes filing date of application.
Tricentric for severe service: the Unique Valve System, by CS Valve Company Tricentric Division, product brochure, 16 pages, undated, but precedes filing date of application.

*Primary Examiner*—John Fox
*Attorney, Agent, or Firm*—Anthony R. Lambert

[57] ABSTRACT

A butterfly valve in which a valve body has a transverse shaft mounted in transverse bores in the valve body. A disc is mounted on the shaft for opening and closing the valve. A groove in the shaft receives a ring that is fastened within one transverse bore, for example by a cover plate that clamps the ring against a shoulder in the transverse bore. The ring may be machined to fit the groove loosely and thus play of the shaft in relation to the valve body is governed by the amount of play of the ring in the groove. Bearings on which the shaft is supported are provided with interior wiper seals, and a lock is provided for locking the shaft to the valve body in case of failure of the shaft, for example in case of failure of the shaft at the disc.

9 Claims, 3 Drawing Sheets

VALVE WITH IMPROVED SHAFT RETAINER

BACKGROUND OF THE INVENTION:

In a conventional butterfly valve, such as the tricentric valve made by C&S Valve Company, a shaft on which a closure disc is mounted is secured against axial movement by a ring mounted in a groove at one end of the shaft. In tricentric valves of which the inventor is aware, the ring is secured relatively tightly in the groove, and is loosely held in place by an annular extension from a plate that is secured to the valve body. In this construction, it is difficult to machine the groove to fit the ring closely, with the result that play in the shaft is difficult to adjust.

SUMMARY OF THE INVENTION

According to a first aspect of the invention, a butterfly valve is disclosed in which a valve body has a transverse shaft mounted in transverse bores in the valve body. A disc is mounted on the shaft for opening and closing the valve. A groove in the shaft receives a ring that is fastened within one transverse bore, for example by a cover plate that clamps the ring against a shoulder in the transverse bore. The ring may be machined to fit relatively loosely within the groove and all play between the shaft and the valve body may occur between the ring and groove in the shaft, rather than between the ring and the valve body.

In another aspect of the invention, bearings on which the shaft is supported are provided with interior wiper seals.

In a still further aspect of the invention, a means is provided for locking the shaft to the valve body in case of failure of the shaft, for example in case of failure of the shaft at the disc.

These and other aspects of the invention are described in the detailed description and claims that follow.

BRIEF DESCRIPTION OF THE FIGURES

There will now be described preferred embodiments of the invention with reference to the drawings, in which like numerals denote like elements and in which.

Figure 1:
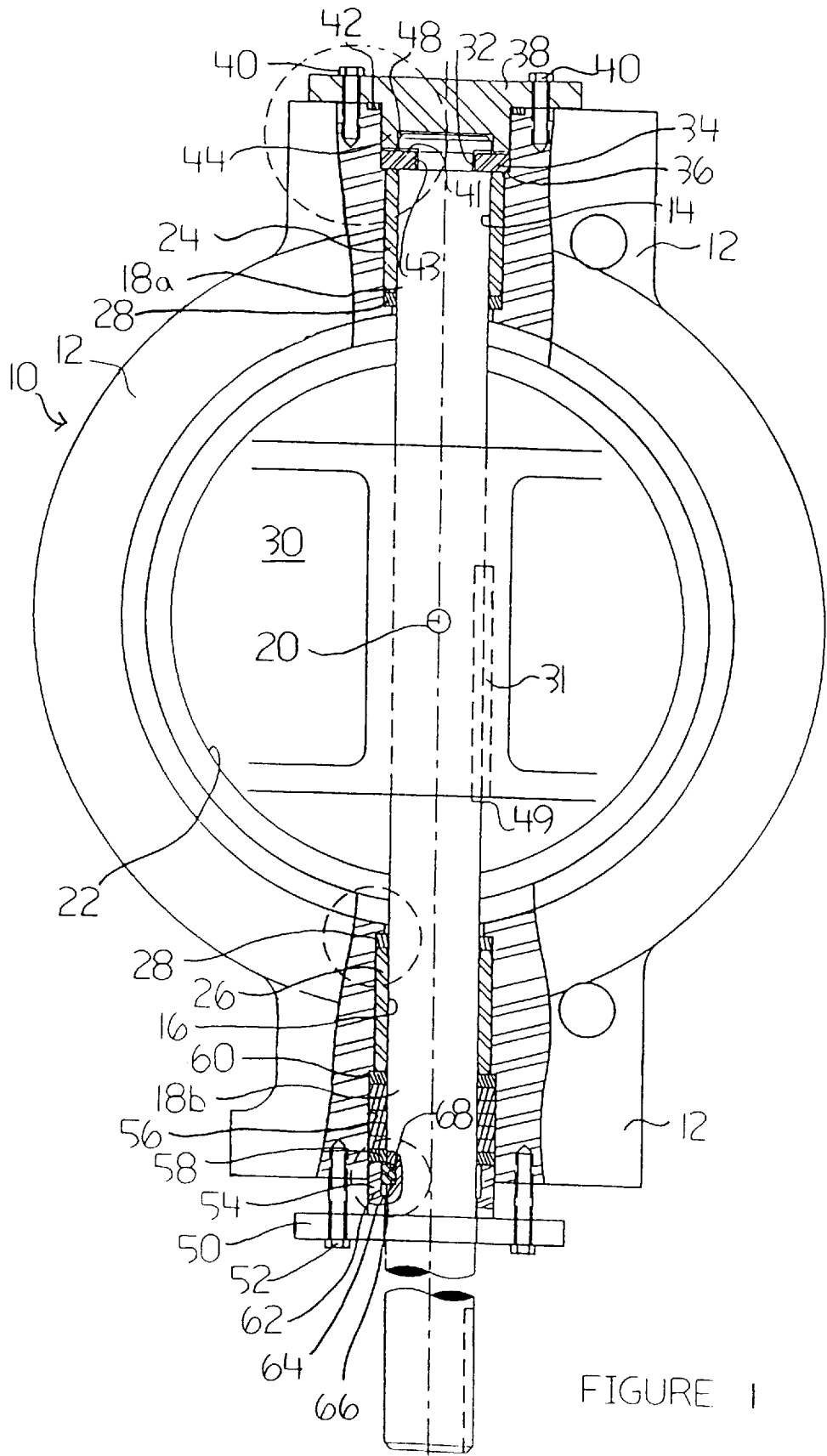
FIG. 1 is a plan view, partly in section, of a valve incorporating improvements according to the invention.
Figure 3:
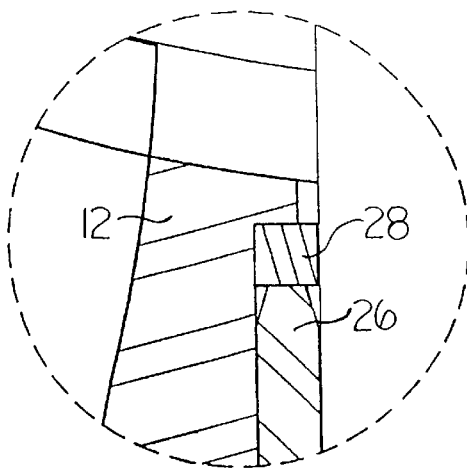
FIG. 3 is an enlarged view of detail B from FIG. 1.
Figure 4:
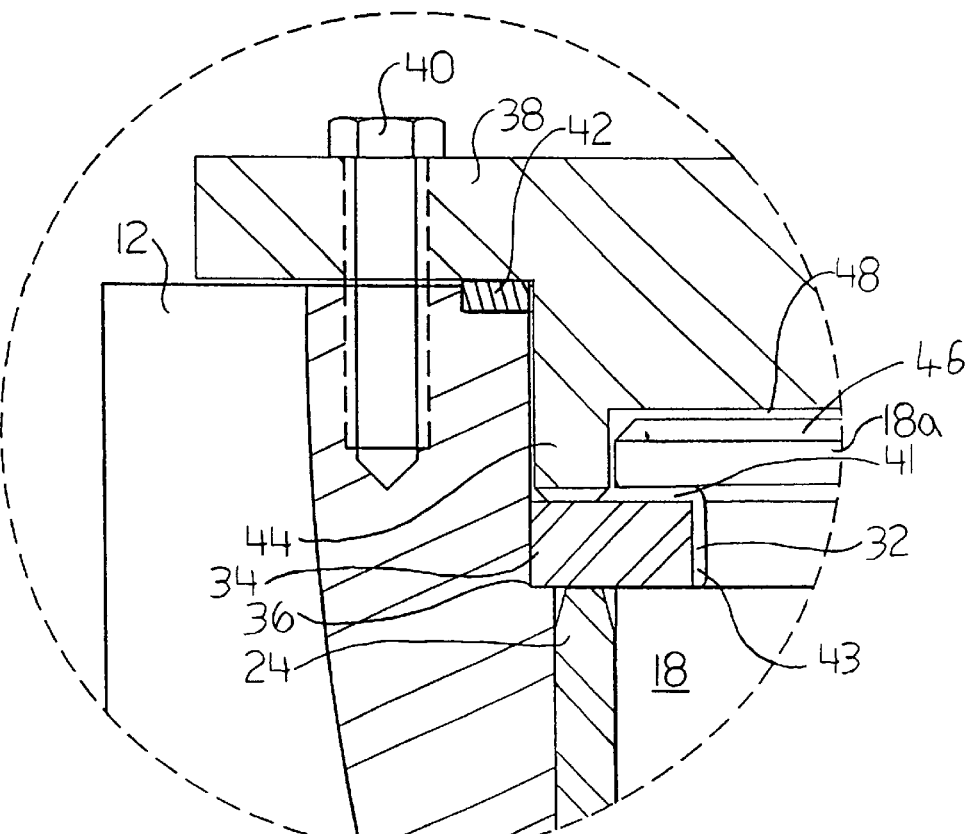
FIG. 4 is an enlarged view of detail C from FIG. 1.

DETAILED DESCRIPTION OF PREFERRED EMBODIMENTS:

Referring to FIGS. 1, 3 and 4, a butterfly valve 10 is formed of a valve body 12 having opposed coaxial transverse bores 14, 16 for receiving a shaft 18. A longitudinal flow passageway 22 extends through the valve body 12 in conventional fashion. The shaft 18 is mounted in the transverse bores 14, 16. One end 18a of the shaft 18 is journalled in bearing 24 surrounding bore 14, and the other end 18b is journalled in bearing 26 surrounding bore 16. In this patent document, the term inward or interior means radially inward, for example, towards the center 20 of the valve, and the term outward or exterior means radially outward, for example away from the center of the valve 10. A soft forgiving material 28 such as an elastomer is located interior of the bearings 24, 26 to prevent material inside valve flow passageway 22 from contaminating the bearings 24, 26. The soft forgiving material 28 acts as a seal or wiper. Wipers 28 are not required on some valve applications.

A disc 30 is mounted on the shaft 18 across the longitudinal flow passageway 22 in conventional fashion using a key 31 which fits in respective slots in the disc 30 and shaft 18. Rotation of the disc 30 opens and closes the longitudinal flow passageway 22. Referring in particular to FIG. 4, a groove 32 extends around the shaft 18 at the first end 18a of the shaft 18. A retainer ring 34, for example a split ring, is mounted coaxially within the transverse bore 14 and is secured against axial movement. The ring 34 extends radially inward into the groove 32 to secure the shaft 18. The ring 34 is secured against inward axial movement by a shoulder 36 in the transverse bore 14. The ring 34 is secured against outward axial movement by a plate 38 mounted across the transverse bore 14.

The plate 38 is secured to the valve body 12 by fasteners 40 such as pins, screws, studs or the like and forms a cover for the transverse bore 14. The plate 38 may be sealed to the body 12 by a seal 42. The plate 38 has an inwardly extending annular member 44 that is clamped against the ring 34 by the action of the fasteners 40. The inwardly extending annular member 44 has an outer diameter substantially equal to the inner diameter of the transverse bore 14 exterior of the shoulder 36 and an inner diameter greater than the diameter of the shaft 18 exterior of the groove 32. This permits the terminal portion 46 of the shaft 18 to rotate in circular recess 48 defined by the annular member 44.

Figure 2:
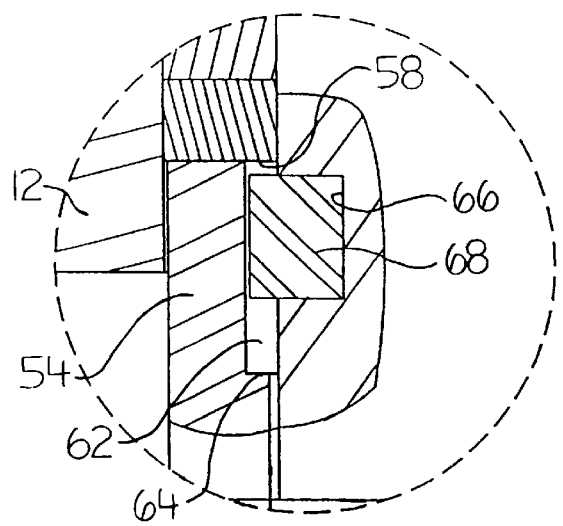
FIG. 2 is an enlarged view of detail A from FIG. 1.

Referring to FIG. 2 in particular, a means is shown for preventing the shaft 18 from moving out of the valve body 12 in case of failure of the shaft 18 between the end 18a and the end 18b, as for example at 49 where the shaft 18 connects to the disc 30. A packing gland 50 is secured by fasteners 52, such as pins, studs, screws or the like. The packing gland 50 has a central opening for receiving the shaft 18. An annular member 54 extends inwardly of the packing gland 50 around the shaft 18 and is received within an enlarged portion 56 of the transverse bore 16. Inward movement of the annular member 54 is limited by a stop 58 formed of rings that are stacked within the transverse bore 16 and against shoulder 60. An annular recess 62 is formed on the radially inward side of the annular member 54. The annular recess 62 is bounded by the stop 58 and a shoulder 64 on the annular member 54. A recess 66 is formed within the end 18b of the shaft 18. A key or stop 68 is received within recess 66 and extends radially outward into annular recess 54. If the shaft 18 fails at 49 or elsewhere between the ring 34 and key 68, the shaft 18 moves outward until the key 68 is stopped against shoulder 64.

Figure 5:
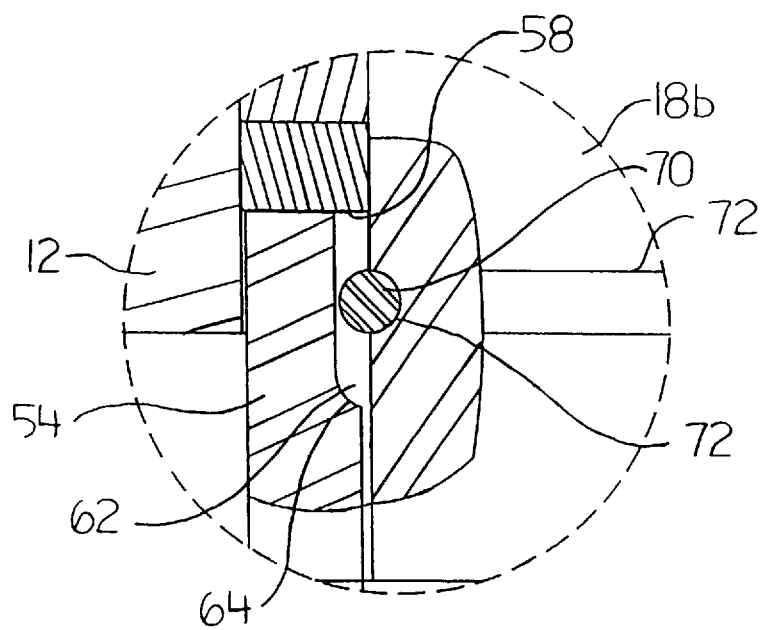
FIG. 5 is an alternative embodiment for the enlarged area shown in FIG. 2.

In a further, preferred embodiment, shown in FIG. 5, the key 68 may be replaced by a split ring 70 that rests in a semi-circular groove 72 in the end 18b of the shaft 18 and also functions as a stop. In this embodiment, the recess 62 is may rounded at the end 74 to fit the ring 70. The ring 70 functions in the same manner as the key 68 to prevent the shaft 18 from blowing out from the valve body 12 in case of failure of the shaft.

The recess 66 and groove 72 weaken the end 18b of the shaft 18 such that, when the shaft 18 is overtorqued, the shaft 18 will break at the recess 66 or groove 72, rather than elsewhere on the shaft 18. The advantage of breakage at the end 18b in case of overtorquing of the shaft 18 is that failure at 49 is avoided, thus preventing the possibility that the disc 30 will be carried down the pipe in which the valve is mounted.

The valve 10 is assembled as follows. First, the seals 28, bearings 24, 26, and rings 58 are installed within the transverse bores 14, 16, with the ring 34 in the groove 32. The disc 30 is placed in the valve 10 and the shaft 18 is inserted through the transverse bores and through the disc 30. Then the key 68 or ring 70 is mounted in the recess 66 or groove 72 respectively. Then, the plate 38 is used to clamp the ring 34 with fasteners 40. Next, the packing gland 50 is inserted over the shaft 18, and fastened to the body 12 with fasteners 52.

The groove 32 may be machined for a desired fit with the ring 34. Consequently, play of the shaft 18 may be limited to the close tolerance of the ring 34 in the groove 32. The axial length of the terminal portion 46 of the shaft 18 is shorter than the axial width of the recess 48, thus permitting a similar amount of play in the circular recess 48. Pressure in the valve during operation will normally move the shaft 18 in the direction of end 18b, causing the space at 41 to compress and appear as play at the other side of the ring 34. As shown at 41 and 43, the ring 34 may be machined to be slightly thinner axially than the groove 32 and to have an inner diameter slightly larger than the diameter of the shaft in the groove 32. Exact fit of the ring in the groove is not required. The ring 34 is held firmly by the plate 38 against the shoulder 36. Thus, play between the shaft 18 and the valve body 12 is accommodated by play between the ring 34 and shaft and not between the ring 34 and the valve body 12.

Immaterial changes may be made to the exemplary embodiment described here without departing from the essence of the invention.

The embodiments of the invention in which an exclusive property or privilege is claimed are defined as follows:

1. A butterfly valve, comprising:
   a valve body having first and second opposed coaxial transverse bores for receiving a shaft and a longitudinal flow passageway extending through the valve body;
   a shaft mounted in the first and second transverse bores, the shaft having first and second ends, the first end being journalled in the first transverse bore and the second end being journalled in the second transverse bore;
   a disc mounted on the shaft across the longitudinal flow passageway, whereby rotation of the disc opens and closes the longitudinal flow passageway;
   a groove extending around the shaft at the first end of the shaft;
   a ring mounted coaxially within the first transverse bore and secured against axial movement by first means limiting inward axial movement and second means limiting outward axial movement, the ring extending radially inward into the groove; and
   the ring being axially thinner than the groove is axially wide to provide play for the ring in the groove;,
   whereby play between the shaft and the valve body is accommodated by play between the ring and shaft and not between the ring and the valve body.

2. The butterfly valve of claim 1 in which the means for limiting inward axial movement of the ring is a shoulder in the first transverse bore.

3. The butterfly valve of claim 1 in which the means for limiting outward axial movement of the ring is a plate mounted across the first transverse bore.

4. The butterfly valve of claim 3 in which the plate forms a cover for the first transverse bore.

5. The butterfly valve of claim 2 in which the ring is clamped against the shoulder.

6. The butterfly valve of claim 5 in which the ring is clamped against the shoulder by a plate having an inwardly extending annular member.

7. The butterfly valve of claim 6 in which the inwardly extending annular member has an outer diameter substantially equal to the inner diameter of the first transverse bore exterior of the shoulder and an inner diameter greater than the diameter of the shaft exterior of the groove.

8. The butterfly valve of claim 1 in which the shaft is journalled in first and second bearings, and elastomeric sealing material is disposed around the shaft interior of the bearings and exterior of the flow passageway.

9. The butterfly valve of claim 1 further including means at the second end of the shaft to secure the shaft to the valve body.

* * * * *